United States Patent
Thomas (10) Patent No.: US 7,991,019 B2
(45) Date of Patent: Aug. 2, 2011

(54) METHODS AND SYSTEMS FOR COMBINING MEDIA INPUTS FOR MESSAGING

(75) Inventor: Renjit Tom Thomas, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1212 days.

(21) Appl. No.: 11/533,303

(22) Filed: Sep. 19, 2006

(65) Prior Publication Data
US 2008/0069120 A1 Mar. 20, 2008

(51) Int. Cl.
*H04J 3/02* (2006.01)
*H04N 7/14* (2006.01)
*H04N 7/173* (2006.01)

(52) U.S. Cl. ............... 370/537; 348/14.08; 725/109

(58) Field of Classification Search .................. None
See application file for complete search history.

(56) References Cited

U.S. PATENT DOCUMENTS

| | | | |
|---|---|---|---|
| 5,544,321 A | 8/1996 | Theimer et al. | |
| 5,611,050 A | 3/1997 | Theimer et al. | |
| 6,285,407 B1* | 9/2001 | Yasuki et al. | 348/554 |
| 7,061,399 B2 | 6/2006 | Leck | |
| 7,162,451 B2 | 1/2007 | Berger et al. | |
| 7,289,788 B2 | 10/2007 | Shan | |
| 7,640,341 B2 | 12/2009 | Regan | |
| 2001/0053274 A1* | 12/2001 | Roelofs et al. | 386/46 |
| 2003/0001846 A1* | 1/2003 | Davis et al. | 345/474 |
| 2003/0040334 A1 | 2/2003 | Lee | |
| 2003/0070177 A1* | 4/2003 | Kondo et al. | 725/106 |
| 2003/0078966 A1* | 4/2003 | Kinjo | 709/203 |
| 2003/0095540 A1 | 5/2003 | Mulligan et al. | |
| 2003/0146854 A1 | 8/2003 | Jones | |
| 2003/0169151 A1 | 9/2003 | Ebling et al. | |
| 2003/0232593 A1* | 12/2003 | Wahlroos et al. | 455/3.05 |
| 2004/0133597 A1* | 7/2004 | Fano et al. | 707/104.1 |
| 2004/0249962 A1 | 12/2004 | Lecomte | |
| 2004/0259537 A1 | 12/2004 | Ackley | |
| 2005/0165918 A1* | 7/2005 | Wantanabe et al. | 709/223 |
| 2005/0195274 A1* | 9/2005 | AbiEzzi et al. | 348/14.02 |
| 2005/0226264 A1* | 10/2005 | Toyoda | 370/431 |
| 2006/0001737 A1 | 1/2006 | Dawson et al. | |
| 2006/0053468 A1 | 3/2006 | Sudoh et al. | |

(Continued)

FOREIGN PATENT DOCUMENTS

JP 2001-257709 A 9/2001

(Continued)

OTHER PUBLICATIONS

U.S. Appl. No. 11/533,311—Office action dated Jan. 7, 2009.

(Continued)

*Primary Examiner* — Ricky Ngo
*Assistant Examiner* — Clemence Han
(74) *Attorney, Agent, or Firm* — Kristine E. Matthews; David C. Ripma (57) ABSTRACT

With the growing number of, both personal and shared, devices that may be connected to the Internet, the number of possible media sources that may provide input for a message increases, as does the complexity of message preparation. Additionally, with the introduction of shared devices, such as televisions, as media sources for messages, both authentication and security issues are of fundamental importance. Aspects the present invention are related to systems and methods for combining media inputs at an external, central server for messaging.

20 Claims, 8 Drawing Sheets

U.S. PATENT DOCUMENTS

| | | | |
|---|---|---|---|
| 2007/0028279 A1* | 2/2007 | Kim | 725/113 |
| 2008/0024593 A1* | 1/2008 | Tsirinsky et al. | 348/14.08 |
| 2008/0034435 A1 | 2/2008 | Grabarnik et al. | |
| 2008/0052150 A1* | 2/2008 | Grouf et al. | 705/14 |
| 2008/0072261 A1* | 3/2008 | Ralston et al. | 725/62 |

FOREIGN PATENT DOCUMENTS

| | | |
|---|---|---|
| JP | 2003-316697 A | 11/2003 |
| WO | 03077550 A1 | 9/2003 |
| WO | 2006070067 A1 | 7/2006 |

OTHER PUBLICATIONS

U.S. Appl. No. 11/533,311—Office action dated Jun. 24, 2009.
Application No. EP 07 01 8227—European Search Report—Date of completion of the search Jun. 26, 2009.
U.S. Appl. No. 11/533,311—Office action dated Dec. 2, 2009.
U.S. Appl. No. 11/533,311—Office action dated Jun. 10, 2010.
Japanese Patent Application No. 2007-240138—Office Action—Mailing Date Mar. 2, 2010.

* cited by examiner

METHODS AND SYSTEMS FOR COMBINING MEDIA INPUTS FOR MESSAGING

FIELD OF THE INVENTION

Embodiments of the present invention comprise methods and systems for combining media inputs from multiple sources for messaging.

BACKGROUND

With growing numbers of both personal and shared devices that may be connected to the Internet, the number of possible media sources that may provide input for a message increases, as does the complexity of message preparation. Additionally, with the introduction of shared devices, such as televisions, as media sources for messages, both authentication and security issues are of fundamental importance.

SUMMARY

Some embodiments of the present invention comprise methods and systems for combining media inputs from multiple sources into a message at an external, central server.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

A growing number of devices may provide connection to the Internet. These devices may include both shared devices, also considered public devices, such as a television, and private devices, for example, a personal computer, a personal digital assistant, and a cell phone. Further, increased Internet-protocol-based (IP-based) services are being deployed on cell phones; while home devices, like televisions, may be connected to the Internet via numerous methods including Ethernet, wireless connection, and cable. Developments such as these may open up a wide range of new services and applications that link various devices. An example of one application is transmission of multi-media messages and live message streams to, and from, any of these devices. A message may be an electronic mail message (email), a multi-media message (MMS), a video mail, a voice mail, or any other communication of media content, including those comprising live media streams of either voice or video or both. Embodiments of the present invention comprise methods and systems for combining input from multiple devices into a message.

Figure 1:
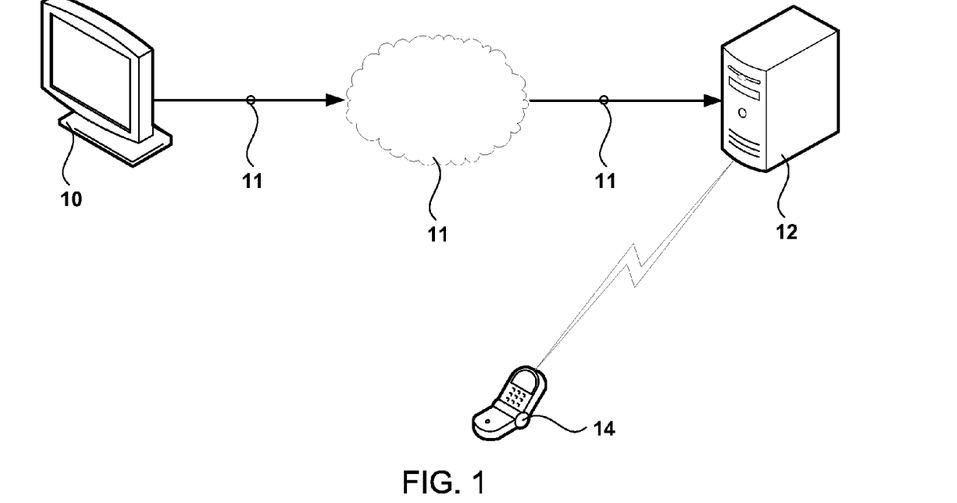
FIG. 1 is a drawing showing embodiments of the present invention in which media input from a public device and a private device may be combined at an external, central server into a single message.

In some embodiments of the present invention illustrated in FIG. 1, a video shot captured from a television 10 may be uploaded 11 to an external, central server 12 where the video shot may be combined at the external, central server 12 with media input, for example voice, text, or image, from an additional device, such as a cell phone 14, to form a message that then may be transmitted to a recipient using IP-based communication. The television may be connected to an internal, home network and communicate to other home devices using a standards such as that referred to as Digital Living Network Alliance (DLNA). The television may be connected by any of a variety of connections including a wireless connection, either inbuilt or removable, a cable connection, or an Ethernet connection, also by which the television may be connected to the Internet using a variety of service providers.

Figure 2:
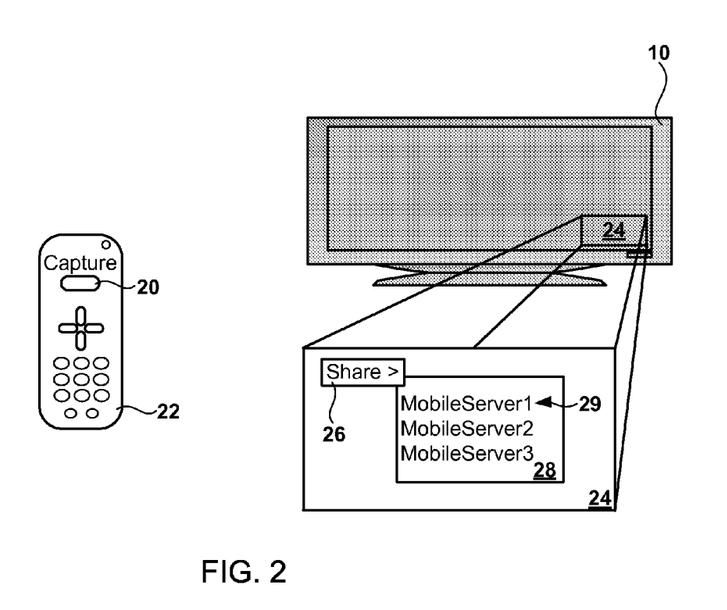
FIG. 2 is a drawing depicting an exemplary user interface (UI) of embodiments of the present invention for sharing content by an external, central server.

The television shot may be captured by depressing a dedicated capture button on a television remote control. The shot may be uploaded to the server using an exemplary user interface (UI) as shown in FIG. 2. After depressing the capture button 20 on the television remote control 22, a hierarchical pull-down, or other formatted, menu 24 may be displayed on the television 10. This exemplary menu depicts an option to share 26 the shot and allows the user to further identify by which service 28 he wishes to share the shot. The entry on the service menu 28 labeled "Mobile Server 1" 29 may indicate the external, central server on which messages may be formed combining input from multiple devices.

Figure 3:
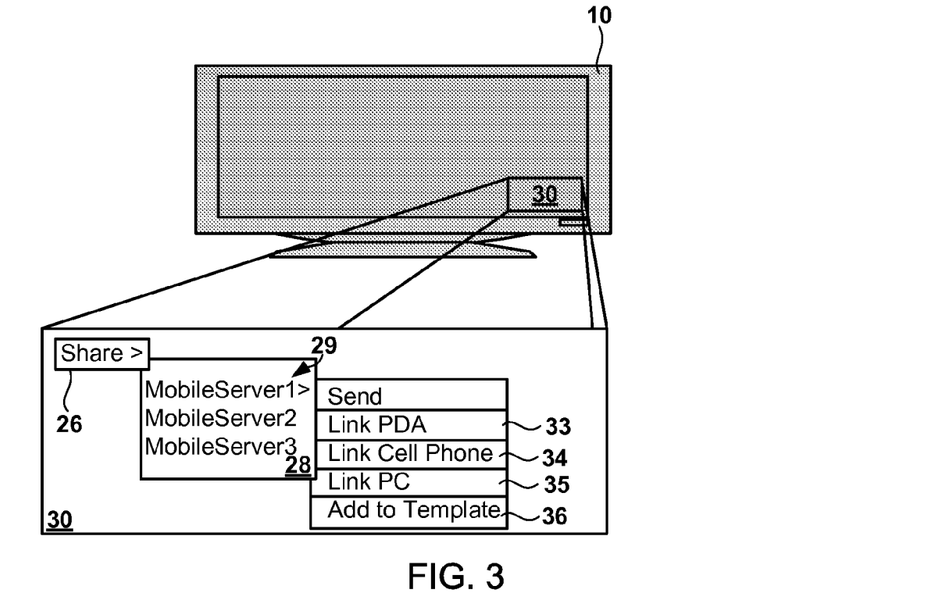
FIG. 3 is a drawing depicting an exemplary user interface (UI) of embodiments of the present invention for linking multiple devices to content for message composition.

After the shot is uploaded to the external, central server, the external, central server may detect the presence of other authenticated devices. The availability of these devices may be presented, as depicted for example in FIG. 3, to the user through the television UI 30 as an option to link to the devices 33-35. Upon selection of a particular device with which to link, the server may alert the requested device that a message is being composed and that input from the device is requested. The server may send a token to the device with information for example, but not limited to, the user information, time-out information, and the internal identification of the message. The device's stack may use the token to authenticate to the server, thus allowing completion of the message. The user may accept the alert at the selected device and interact through a UI on that device.

Figure 4:
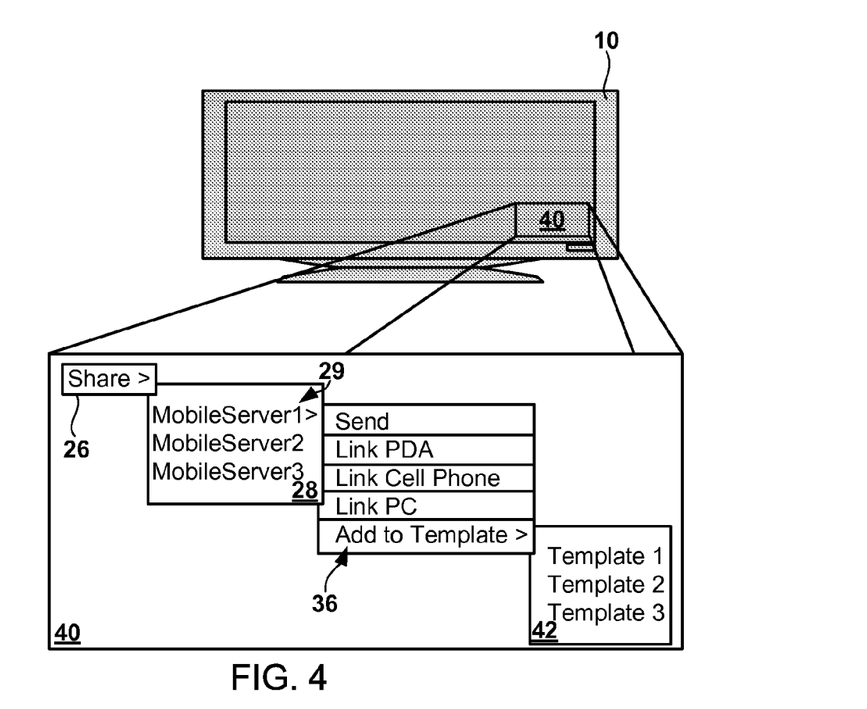
FIG. 4 is a drawing depicting an exemplary user interface (UI) of embodiments of the present invention in which a template may be invoked for composing a message comprising input from multiple media sources.

In alternate embodiments, the user may select to add the television shot to a predefined template 36 residing on the external, central server. Upon the user selecting the option to "Add to a template" 36, the UI 40 will depict a menu of available templates 42 as shown in FIG. 4. When a template is selected, the template may be invoked at the external, central server. The content from the device may be associated with the appropriate field through a template engine, and alerts to any additional devices from which media content is required may be initiated as described above.

Figure 5:
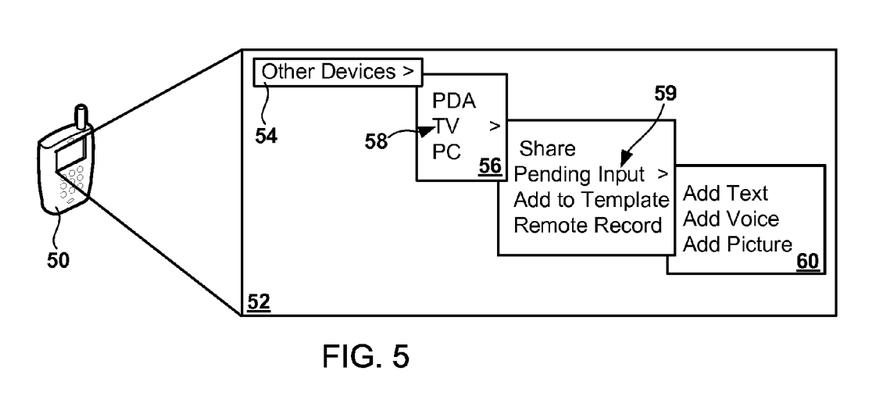
FIG. 5 is a drawing depicting an exemplary user interface (UI) of embodiments of the present invention in which a private device may add additional content to a message being composed at an external, central server at which input to the message from an additional media source may be already pending.

When an alert is received at a device for which a link request was made, for example in this exemplary embodiment, the cell phone, the user may be presented through the UI 52 on that device 50, as shown in FIG. 5, a menu of the other devices 54 available from which the user may select that from which he previously uploaded content, in this example the television 56. Upon selection of one of the other devices 58, the user may be presented with an indication 59 that input may be required from the current device to complete the message. The user may then add 60 content from the device to the message. For example if the device is a cell phone, text, voice, or a captured picture from the cell phone camera may be added to the message being composed at the external, central server. The message may then be sent to the intended recipient from the external, central server.

Figure 6:
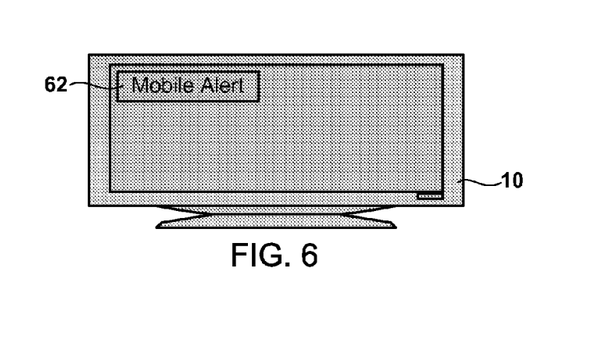
FIG. 6 is a drawing depicting an unobtrusive alert at a public device.

In alternate embodiments, the process may be initiated from the cell phone, or other private device, and an alert may be sent to the television, or other public device, by the external, central server. If the user has explicitly logged on the television, the alert 62 may be shown on the television 10 as in FIG. 6. Otherwise, the server alert may be shown so as to respect the privacy of the television being used by other members. In these embodiments, the alert may not be shown unless the television is set to show alerts for any user without restriction, or if the user has indicated his presence to the television in some fashion.

At the external, central server, a template may be used for generating multiple media inputs from multiple devices. An exemplary template is shown below. This exemplary template specifies the combination of input from a television and a cell phone.

```
<template name= "TV cell phone sharing">
    <input field = "to" type= "address" req = "mandatory"/>
    <input field = "cc" type= "address" req = "optional"/>
    <input field = "subject" type= "text" req = "optional"/>
    <input field = "attach" type= "img" req = "optional"
    src= "TV"/>
    <input field = "attach" type= "img" req = "optional"
    src= "cellphone"/>
    <input field = "attach" type= "voice" req = "optional"
    src= "cellphone"/>
    <input field = "attach" type= "text" req = "optional"
    src= "cellphone"/>
    <input field = "attach" type= "text" req = "optional" src= "TV"/>
    <templatemessages editable= "yes">
      <message>
          Hi
      </message>
      <message>
          Hello
      </message>
      <message>
          Check this out!
      </message>
      <params src = "TV" req= "optional">
          <channel />
          <region />
          <DRM />
          <time />
          <date />
      </params>
</templatemessages>
```

In alternate embodiments of the present invention, the user may send the television shot immediately after acquisition on the television using a composer local to the television through the television UI. The shot may be sent immediately or text may be added using the television composer prior to sending the shot.

Embodiments of the present invention comprise combining media input from multiple devices at an external, central server into a single message which may be transmitted to a recipient using IP-based communication. There is no inherent limit to the number of devices from which media may be combined into a single message. Exemplary embodiments of the present invention shown in FIG. 7 and FIG. 8 demonstrate the combination of media from three devices.

Figure 7:
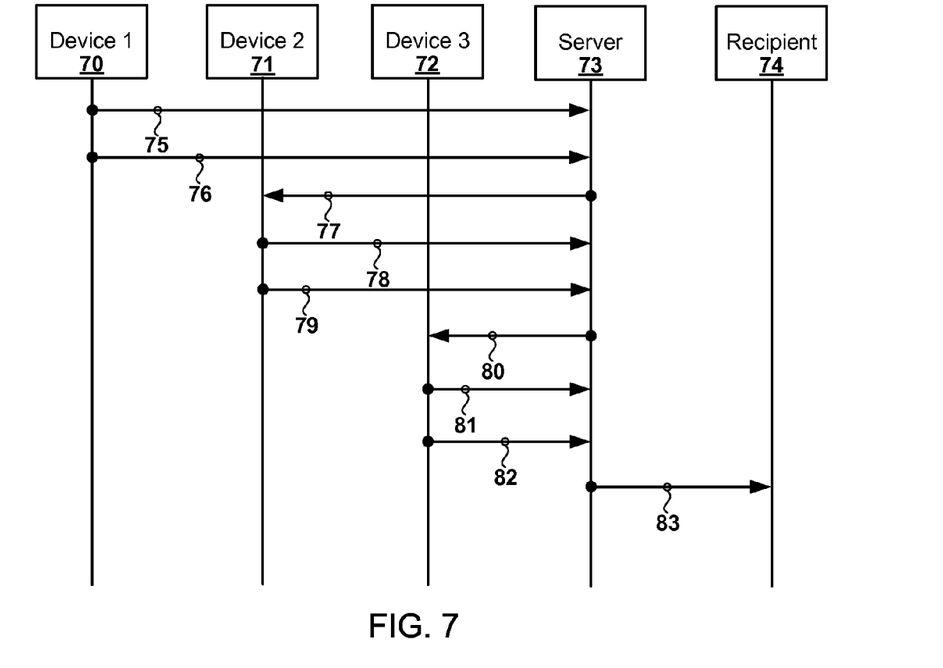
FIG. 7 is a data flow diagram that depicts data flow for embodiments of the present invention in which multiple devices may add content to a message and may request content from additional devices.

As shown in FIG. 7, a first device 70 may send media 75 and a request to link 76 to a second device 71 to an external, central server 73. The external, central server 73 may send an alert 77 to the second device 71. The second device 71 may send media 78 and a request to link 79 to a third device 72 to the external, central server 73, which in turn, may send an alert 80 to the third device 72. The third device 72 may send media 81 and a request to send 82 the message to the recipient 74 to the external, central server 73. After combining the media 75, 78, and 81, the external, central server 73 may send the combined message 83 to the recipient 74. This may be extended to any number of devices.

Figure 8:
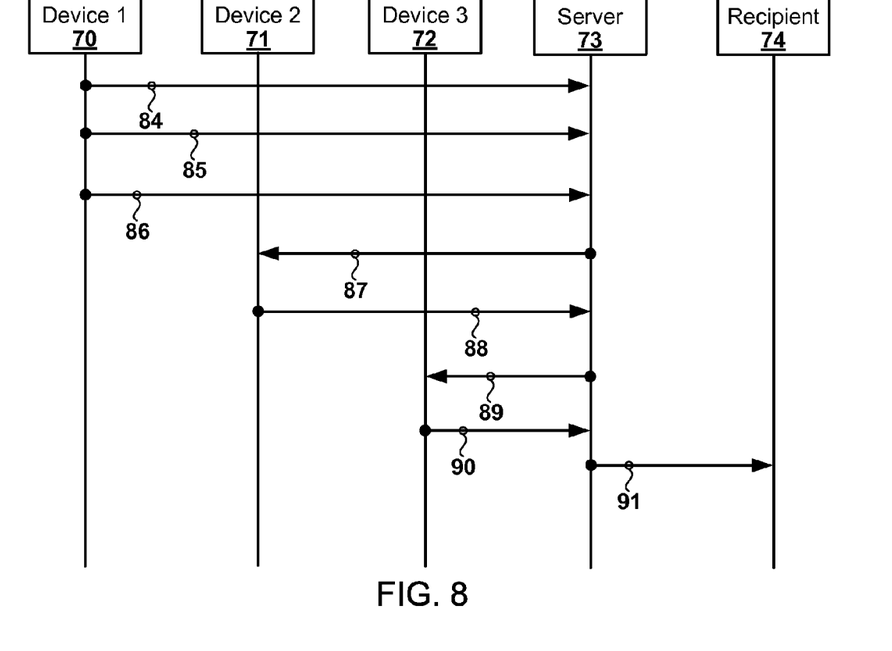
FIG. 8 is a data flow diagram that depicts data flow for embodiments of the present invention in which a device may add content to a message and may request additional content from a multiplicity of additional devices.

As shown in FIG. 8, a first device 70 may send media 84 and a request to link 85 to a second device 71 and a request to link 86 to a third device 72 to an external, central server 73. The external, central server 73 may send an alert 87 to the second device 71 and an alert 89 to the third device 72. The second device 71 and the third device 72 may each send media, 88 and 90, respectively, to the external, central server 73. After combining the media 84, 88, and 90, the external, central server 73 may send the combined message 91 to the recipient 74. This may be extended to any number of devices.

Embodiments of the present invention may comprise a combination of those described in FIG. 7 and FIG. 8.

For shared devices, such as a television, when the user wants to access his personal account at the external, central server, he may log in explicitly on the shared device to his personal account. If an alert is generated via the server to the shared device based on a cell phone request, then the alert may be shown on the shared device in a non-intrusive way, as in FIG. 6.

However, it may not convenient for users to type in their passwords every time they wish to share media, for example a television shot, from a public device. Therefore, in some embodiments of the present invention, any person who is a member of a community that shares a public device may log into the shared device for a one-time setup session, using his account password. The member may then select a second password for sharing media. This secondary password may be the same as the account password or it may be a different password. The member may then log onto the external, central server and enter the same second password for sharing. Thus both the server and the public device know the set of sharing passwords for each user. The public device may encrypt these passwords with its own device password or certificate, for added security.

Figure 9:
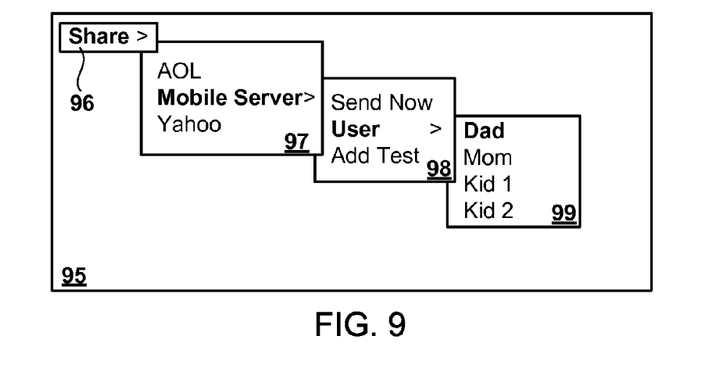
FIG. 9 is a drawing of an exemplary user interface (UI) of embodiments of the present invention in which media may be immediately shared by a previously selected user.

An exemplary UI 95 for a public device is depicted in FIG. 9. After the capture of the media, the option to share 96 the media may be selected. Then the external, central server 97 may be selected from a list of available services 97, and the user 98 may be identified from a list of registered users 99. The shared device will encrypt the content with the sharing password for the user and upload the content to the server. For example, the Advanced Encryption Standard (AES) may be used, with the AES key being random and encrypted with the sharing (secondary) password.

Figure 10:
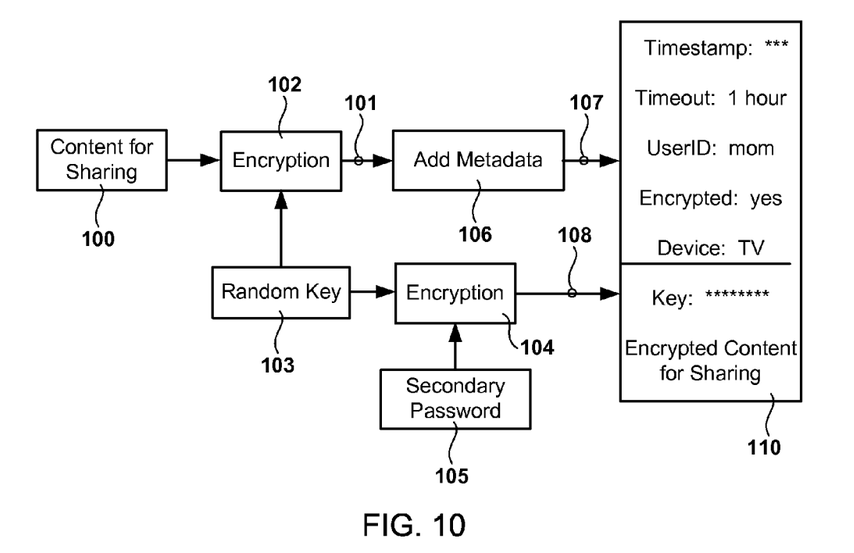
FIG. 10 is a drawing showing embodiments of the present invention in which content may be uploaded from a shared device to an external, central server using a secondary password.

Embodiments for instant uploading from a shared device using the secondary password may be depicted in FIG. 10. The media content 100 on the shared device may be encrypted 102, for example using AES encryption, using a random key 103. The random key 103 may be encrypted 104 using the secondary, sharing password 105. Metadata, for example timeout information, may be added 106. The encrypted content 101, the metadata 107, and the encrypted, random key 108 may be uploaded to the external, central server. The metadata may be maintained in a table 110 at the external, central server as indicated in FIG. 10. In alternate embodiments, the metadata may be included in the media itself.

Figure 11:
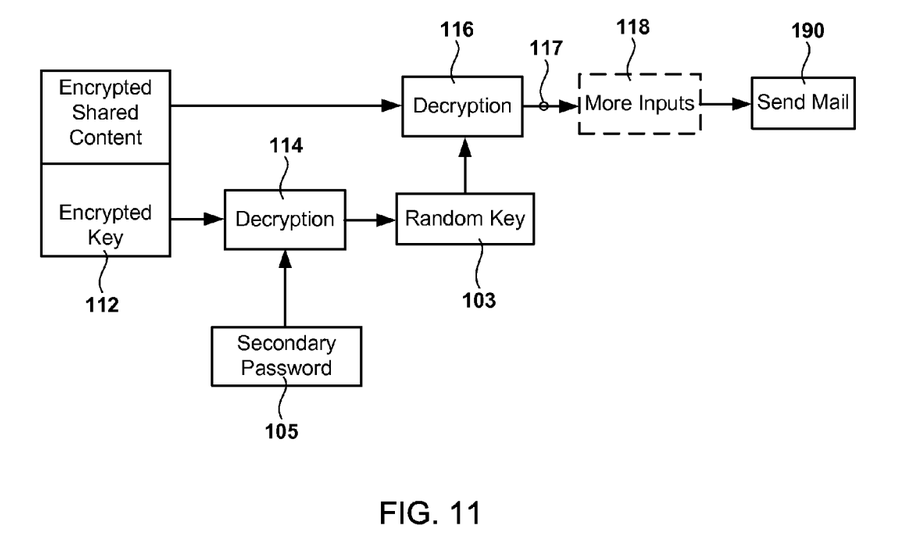
FIG. 11 is a drawing showing embodiments of the present invention in which an external, central server may decrypt content using a secondary password.

The external, central server may use the secondary password to decrypt the data. Embodiments in which the external, central server may decrypt the data using the secondary password may be shown in FIG. 11. The encrypted shared content and key 112 may be decrypted at the external, central server using the secondary password 105 stored at the external, central server. The secondary password 105 may be used to decrypt 114 the random key 103. The random key 103 may then be used to decrypt 116 the content back to clear data 117. The clear data 117 may be combined with additional media from other sources 118, and the message may then be sent 119 to the intended recipient. All users may be able to access the uploads, but only the user associated with the secondary password may be able to send them in a message.

The external, central server may save the uploads based on the device from which they were sent, or the external, central server may save the uploads based on the user that sent the upload. In some embodiments, a user may send a message directly from a device. In these embodiments, he may need to explicitly log in to the device to send the message. In alternate embodiments, a user may add input from an additional device and finalize the message. He may select an option as presented by a device UI to alert the desired additional device for input. If the additional device is a private device, it may be alerted and user can complete the message as required. Internally the external, central server may recognize the user's upload from the private device, and then the server may decrypt the content back to clear data and complete the message.

Unfair activity, including flooding and attempted unauthorized access, may be detected at the server and the corresponding user may be alerted to such activity on any of his private devices.

In alternate embodiments, a message may be directly completed by a user explicitly logging onto the external, central server and completing the message through a template or other input mechanism.

In some embodiments of the present invention, when a public device boots up, it may convey its presence to all registered users from the secondary password mechanism. Standard challenge-response may be used for authentication of the public device to the server. The server may then relay the presence of each registered user to their respective private devices. In some embodiments, permission to relay user presence to other users may be explicitly granted by a user.

Embodiments in which a sharing password is input during an initial, one-time setup operation may use symmetric encryption approach for encrypting the AES random key. In alternate embodiments, a user may log on to the external, central server using an account password, and the user may then create a sharing private-public key pair. The public key may reside at the server and private key at the shared device. In these embodiments, the user may transfer and install the private key on the shared device.

In some embodiments of the present invention, the sharing password/key may be stored in each public device and may be re-encrypted with a separate, for example the manufacturer's, device password or certificate key.

In some embodiments, the uploaded media may be marked by the server as being encrypted or not based on explicit or shared login. In some embodiments, timeouts may be associated with a media, such that if the second device (that which was requested by linking or template) does not respond within the timeout interval, the uploaded media may be removed at the server. Metadata such as this, encrypted and timeout, may be maintained in a table at the external, central server or may be included in the metadata of the media itself. For example, if the media is a Joint Photographic Experts Group (JPEG) image, the metadata may be contained in the 0xffe3 header.

In some embodiments, if there are multiple inputs to a message uploaded to the external, central server, previews may be available on a private device upon responding to an alert.

In some embodiments, the user may capture media, for example image or video, to a local storage means, for example a hard disk in television or a card inserted in a Personal Computer Memory Card International Association (PCMCIA) slot, before uploading to the external, central server. Since the device is a shared device, the captured media may be encrypted. In alternate embodiments, access control may be modified at file system level. In these embodiments, the sharing application may mark in an internal table who is selected for sharing, and then during the file write, future access to this file may be marked as granted only to that selected user. In these embodiments, a user may write to any other user's file area, but to access those files, an explicit login with the secondary password may be needed. When a file so marked is uploaded to the server, the server will mark it as belonging to the respective user only.

In embodiments in which the file is encrypted with the secondary password, no access control may be needed and the application layer can handle the privacy of the user. Thus the file system may be kept intact.

In some embodiments of the present invention, a multimedia message may be received on a private device, for example a cell phone. The user may ask the external, central server to redirect a portion of the message, for example the image content, to a shared device, such as a television, which may allow the content to be viewed in more favorable conditions, such as in higher resolution. In these embodiments, the server may send a token to the public device with access being marked for the specific user and with a time-out constraint. The application on the shared device may receive the token and may show an alert. The user may select the alert for viewing the content through a UI on the shared device. An exemplary token format may be given by:

GUID: 21783647as23av
Message ID: 2gh2s76az
InviteSource: 3608288350
DestinationName: TV
DestinationID: 01923338561
TimeStamp: 21:30:23T8:11:2006
TimeOut: 10:00
Signature: 23hsg15667uys2== where "GUID" may be the identification of this token, and "Message ID" may be the identification of the message being directed, and "Signature" may be the signature of the server. The application on the shared device may make a request to the server with the same token, and the server may send the content to the shared device.

When the content is being sent to the shared device from the external, central server, the shared device may save it as a local file for display. In some embodiments, the external, central server may encrypt the content with the secondary password, before sending the attachment. The shared device may determine the user from the token and retrieve the associated password from a secure internal storage location and may decrypt and display the content on the shared device.

In some embodiments of the present invention, communication of, for example status messages, set-up information, uploads, may be accomplished using Web Service Description Language (WSDL-SOAP) on XML on HTTP. In embodiments where security may be required, Secure Sockets Layer (SSL) may be used.

In some embodiments, a shared device may have its own device password/certificate. In these embodiments, upon boot up, the shared device may log in to the external, central server using standard challenge-response methods advertising its presence to the server. The association of the device password along with its device identification (deviceID), at the external, central server may be done using a personal computer, during a one-time set-up. In alternate embodiments, a user may associate the device password with their secondary passwords one time at set-up. The shared device may send an XML message to the external, central server, and the external, central server may associate the device password with the user secondary password. An exemplary message may be as follows:

```
<?xml version="1.0" encoding="utf-8" ?>
<S:Envelope xmlns:S="http://schemas.xmlsoap.org/soap/envelope/"
   xmlns:sb="urn:liberty:sb:2003-08" xmlns:sa="urn:liberty:sa:2004-04" >
<S:Header>
<sb:Correlation S:mustUnderstand="1"
   messageID="uuid:0023923-28329023-238239023"
   timestamp="2004-06-17T23:55:01Z" />
</S:Header>
<S:Body>
   <registerdevice>
      <username> dad </username>
      <serialnumber> 0198373 </serialnumber>
      <type> TV </type>
      <ID> ashadsahdhdlsajsaldslalkuuiwyuy== <ID>
   </registerdevice>
</S:Body>
</S:Envelope>
```

In alternate embodiments, the public device may have certificates, and the user may associate the certificate with the secondary passwords in the same way.

In some embodiments of the present invention, the external, central server may maintain the presence of each user and device according to the device type. When shared device logs in with a device password or secondary passwords, the external, central server may mark the presence of the registered users associated with the shared device. In alternate embodiments, the external, central server may update the presence of users as to be able to receive explicit alerts when an explicit login is made. Alerts may be sent to devices based on user preferences which may be set at the external, central server. Standard challenge-response mechanisms, for example Simple Authentication and Security Layer (SASL) may be used for logging in.

In some embodiments of the present invention shown in FIG. 10, instant sharing of media may be achieved by setting up a token in an XML message at the external, central server for uploading, using an HTTP post to perform the upload, sending metadata in an XML message, and indicating the end of the transfer in an XML message. The external, central server may associate the metadata, which may include user access, with the uploaded image once the transfer is complete.

In some embodiments of the present invention, a video stream from a television, or other video source device, may be shared with a single recipient or multiple recipients. Each recipient may receive the stream on a different type of device. The stream may be broadcast over IP from the video source, with authentication so that the same stream may be sent to multiple recipients, each with a different type of device. A scalable stream may be transmitted, in order that recipients with lesser bandwidth can discard the higher quality layers.

In alternate embodiments, one stream may be sent to an external, central media server which may then broadcast the stream to multiple recipients. The external, central server may transcode the stream if necessary. In some embodiments, the source device may sub-sample the video stream.

In some embodiments of the present invention, an additional live stream may be sent from an additional device along with the above discussed video. This stream may be from a cell phone device. The presentation of the multiple live streams at the receiving devices may be mandated by the initiating user. For example, he may specify that the initial video stream can be in the background and the additional stream be presented in a specific location, for example in the top right corner in a picture-in-picture (PIP) style presentation. Alternately he may specify that the initial video stream may be in left side and additional stream on the right side.

This may be pre-specified at the external, central server which routes the streams. An exemplary XML document specifying the presentation of two video streams on respective halves of the screen is shown below.

```
<presentation>
  <source name= "TV">
    <deviceID>
      2
    </deviceID>
    <deviceType>
      public
    </deviceType>
    <canvas type= "x0">
      0
    </canvas>
    <width>
      auto
    </width>
    <canvas type= "y0">
      0
    </canvas >
    <height>
      auto
    </height>
  </source>
  <source name= "cellphone">
    <deviceID>
      1
    </deviceID>
    <deviceType>
      private
    </deviceType>
    <canvas type= "x0">
      <align what="x1" with="x0" ref = 0/>
    </canvas>
    <width>
      auto
    </width>
    <canvas type= "y0">
      0
    </canvas>
    <height>
      auto
    </height>
  </source>
</presentation>
```

An exemplary XML document specifying PIP presentation is shown below.

```
<presentation>
  <source name= "TV">
    <deviceID>
      2
    </deviceID>
    <deviceType>
      public
    </deviceType>
    <canvas type= "x0">
      0
    </canvas >
    <width>
      auto
    </width>
    <canvas type= "y0">
      0
    </canvas>
    <height>
      auto
    </height>
  </source>
  <source name= "cellphone">
    <deviceID>
      1
    </deviceID>
    <deviceType>
      private
    </deviceType>
    <canvas type= "x0">
      <align what="x1" with="x1" ref = 0/>
    </canvas>
    <width>
      auto
    </width>
    <canvas type= "y0">
      0
    </canvas>
    <height>
      auto
    </height>
  </source>
</presentation>
```

Figure 12:
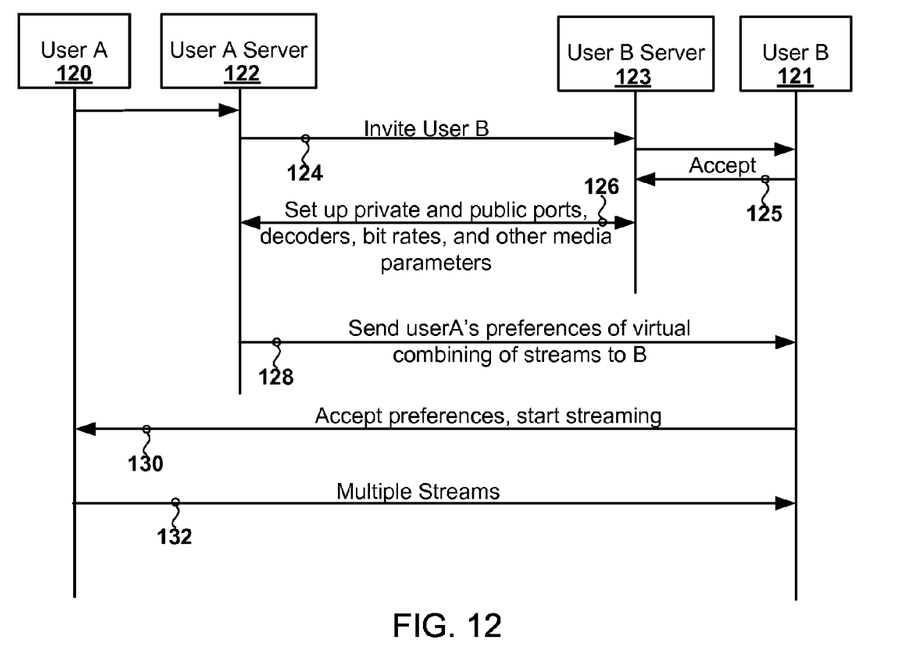
FIG. 12 is a data flow diagram that depicts data flow for embodiments of the present invention in which multiple streams may be combined at a recipient according to a sender's preference.

FIG. 12 shows the data flow in embodiments of the present invention in which multiple live streams may be combined and presented at the receiving device. User A 120 may invite 124, through his server 122, user B 121, through his server 123, to join in a session. The connection initiation may be made using Session Initiation Protocol (SIP). When user B 121 accepts 125 the invitation, public and private ports, decoders, bit rates, and other media parameters may be set up through normal hand shake and authentication methods 126. The preferences of user A 120 for virtual combining of media streams may be sent 128 to user B 121. The preferences may be in the form of an XML file. User B 121 may examine the preferences, set any filters based on the information and set up its decoders. User B 121 may then accept the preferences 130, and streaming may begin 132.

In some embodiments of the present invention, if a recipient cannot handle multiple streams, the receiver may filter out any of the streams. Any unfiltered streams may be presented as stipulated in the rules sent to the recipient by the sender's server.

Figure 13:
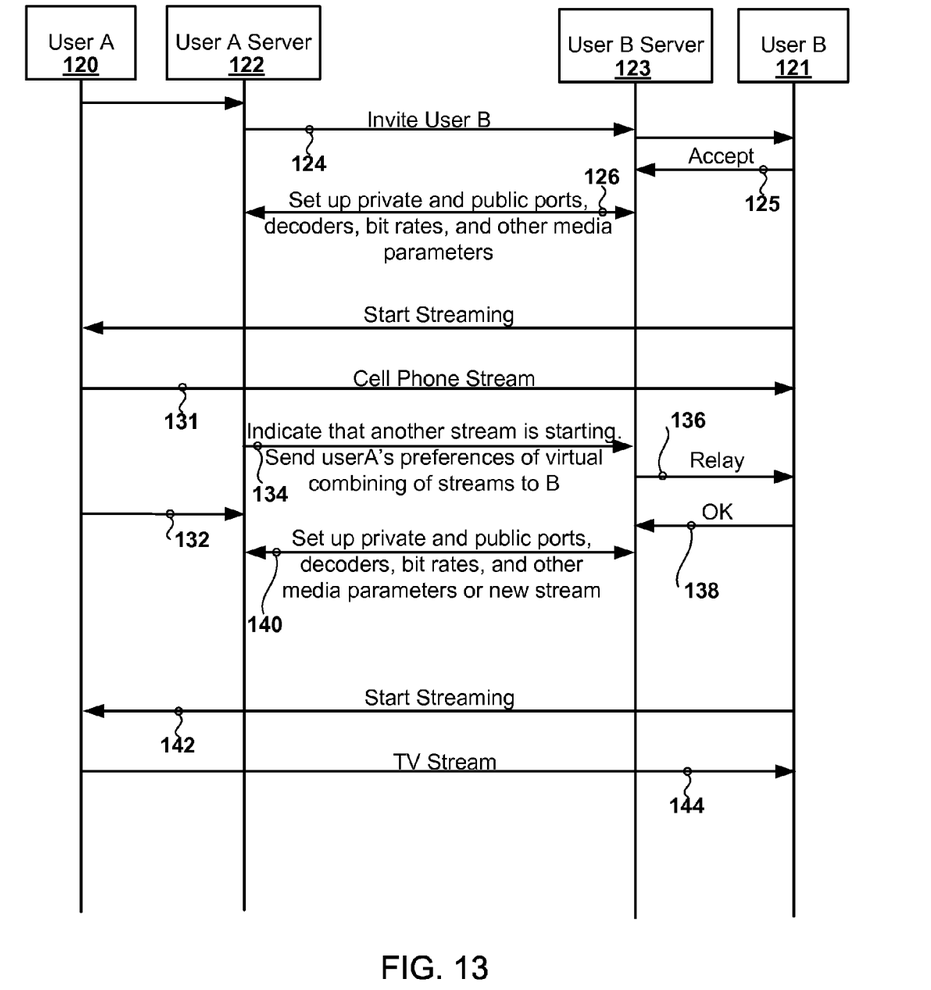
FIG. 13 is a data flow diagram that depicts data flow for embodiments of the present invention in which an additional media stream may be combined at a recipient according to a sender's preference.

In some embodiments of the present invention, an additional media stream may be sent to a recipient after the initial streaming session has commenced. FIG. 13 shows the data flow in such embodiments. User A 120 may invite 124, through his server 122, user B 121, through his server 123, to join in a session. The connection initiation may be made using Session Initiation Protocol (SIP). When user B 121 accepts 125 the invitation, public and private ports, decoders, bit rates, and other media parameters may be set up through normal hand shake and authentication methods 126. Streaming may commence 131. At some time later, user A 120 may desire 132 adding an additional stream to the communication. User A's server 122 may indicate to user B's server 123 that an additional stream is starting and may send the preferences of user A 120 for virtual combining of media streams 134. User B 121 may be notified 136 by his server 123, and accept 138 the additional incoming stream. Public and private ports, decoders, bit rates, and other media parameters may be set up through normal hand shake for this new additional stream 140, and a start streaming notice 142 may be sent to user A 120, at which time streaming of the additional content may commence 144. In some embodiments of the present invention, the initial stream 131 may be from a private device such as a cell phone, and the additional stream 144 may be from a public device such as a television.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for forming and transmitting a message, said method comprising:
    a) receiving, at an external server, a first media input from a first device;
    b) receiving, at said external server, a second media input from a second device;
    c) combining said first media input and said second media input into a message at said external server, wherein said combining uses a template, wherein said template is stored on a resource accessible to said external server;
    d) receiving, at said external server, a link-device request from said first device, wherein said request indicates that input from said link-device is required for said message;
    e) sending an alert to said link-device; and
    f) transmitting said message using IP-based communication.

2. The method as described in claim 1 wherein said first device is a shared device.

3. The method as described in claim 2 wherein said shared device is a television.

4. The method as described in claim 1 wherein said second device is a private device.

5. The method as described in claim 4 wherein said private device is a device selected from the group consisting of a cell phone, a personal digital assistant (PDA), a personal computer, and a personal digital music player.

6. The method as described in claim 1, wherein said link-device is said second device.

7. The method as described in claim 1 wherein said template comprises a first field for said first device and a second field for said second device.

8. A method for forming and transmitting a message, said method comprising:
    a) receiving, at an external server, a first media input from a first device;
    b) receiving, at said external server, a second media input from a second device;
    c) combining said first media input and said second media input into a message at said external server;
    d) receiving, at said external server, a link-device request from said first device, wherein said request indicates that input from said link-device is required for said message;
    e) sending an alert to said link-device; and
    f) transmitting said message using IP-based communication.

9. The method as described in claim 8 wherein said link-device is said second device.

10. A method for forming and transmitting a message, said method comprising:
    a) receiving, at an external server, a first media input from a first device;
    b) detecting an additional device, wherein said additional device is available for contribution of content;
    c) sending a signal to said first device, wherein said signal indicates said availability of said additional device;
    d) receiving, at said external server, a link request from said first device, wherein said link request comprises a request of input from said additional device;
    e) sending an alert to said additional device from said external server, wherein said alert indicates input is requested from said additional device;
    f) receiving, at said external server, a second media input from said additional device;
    g) combining said first media input and said second media input into a message at said external server; and
    h) transmitting said message.

11. The method as described in claim 10 wherein said first device is a shared device.

12. The method as described in claim 11 wherein said shared device is a television.

13. The method as described in claim 10 wherein said second device is a private device.

14. The method as described in claim 13 wherein said private device is a device selected from the group consisting of a cell phone, a personal digital assistant (PDA), a personal computer, and a personal digital music player.

15. The method as described in claim 10 wherein said combining uses a template, wherein said template is stored on a resource accessible to said external server.

16. The method as described in claim 15 wherein said template comprises a first field for said first device and a second field for said additional device.

17. A method for forming and transmitting a message, said method comprising:
    a) storing at least one template on a resource accessible to an external server, wherein said at least one template comprises input fields corresponding to a first device and at least one additional device;
    b) receiving a template selection at said external server;
    c) receiving, at said external server, a first media input from said first device;
    d) sending an alert from said external server to said at least one additional device that input is requested from said at least one additional device;
    e) receiving, at said external server, a second media input from said at least one additional device;
    f) forming a message at said external server using a template engine and said selected template, wherein said message comprises said first media input and said second media input; and
    g) transmitting said message.

18. The method as described in claim 17 wherein said selected template is an XML template.

19. The method as described in claim 17 wherein said first device is a public device.

20. The method as described in claim 17 wherein said first device is a private device.

* * * * *